United States Patent [19]

Juttelstad

[11] Patent Number: 5,564,753
[45] Date of Patent: Oct. 15, 1996

[54] CRYOGENIC FLUID MANIFOLD

[75] Inventor: David L. Juttelstad, Tequesta, Fla.

[73] Assignee: United Technologies Corporation, Hartford, Conn.

[21] Appl. No.: 770,216

[22] Filed: Oct. 3, 1991

[51] Int. Cl.[6] ................................................. F16L 47/02
[52] U.S. Cl. ........................... 285/131; 285/138; 285/156; 285/227; 285/286; 285/904
[58] Field of Search ................................. 285/131, 133.1, 285/138, 156, 904, 227, 286

[56] References Cited

U.S. PATENT DOCUMENTS

| 3,127,200 | 3/1964 | Sayag | 285/227 X |
| 3,186,431 | 6/1965 | Moore | 285/133.1 X |
| 3,195,564 | 7/1965 | Carney et al. | 285/904 X |
| 3,207,533 | 9/1965 | Van Gundy et al. | 285/133.1 X |
| 3,988,029 | 10/1976 | Gibson | 285/904 X |
| 4,925,218 | 5/1990 | Kunz et al. | 285/138 X |

FOREIGN PATENT DOCUMENTS 609140  11/1960  Canada .................. 285/227

*Primary Examiner*—Dave W. Arola

[57] ABSTRACT

A double walled manifold assembly for a cryogenic fluid, such as liquid oxygen, is assembled as alternating bellows portions and tee portions. The inner bellows portions have a greater axial length than the outer bellows portions to enable welding of an inner conduit assembly with the outer bellows portions surrounding the inner bellows portions. The outer tee portions are fabricated in two pieces which are welded together and to the outer bellows portions to complete the assembly.

4 Claims, 3 Drawing Sheets

5,564,753

CRYOGENIC FLUID MANIFOLD

The invention was made under a U.S. Government contract and the Government has rights herein.

BACKGROUND OF THE INVENTION

This invention relates to double walled manifold assemblies, particularly of the type which may be used to conduct a cryogenic fluid, such as liquid oxygen. In such manifolds two concentric conduits are provided, an inner conduit for conducting the cryogenic fluid and an outer conduit for conducting an inert gas in the space between conduits. Because of the temperature difference between the cryogenic fluid and the surrounding environment, both conduits of the manifold are advantageously provided with bellows sections to accommodate expansion and contraction of the inner and outer conduits at different rates. Such bellows sections are provided between each set of concentric tee portions of the manifold to maintain the tee portions in alignment with other structures as fluid and manifold temperatures vary.

Conventionally such manifolds are assembled using flange joints on the inner and outer conduits between alternating tee portions and bellows portions. The use of flanges for assembly of the manifold requires the provision of multiple seals at each joint and imposes extra weight and bulk at each joint.

It is therefore an object of the invention to provide a manifold assembly that is of lower weight and bulk and is capable of being fabricated by welding.

SUMMARY OF THE INVENTION

In accordance with the invention there is provided a manifold assembly for accommodating cryogenic or other high-temperature difference fluids. The assembly includes inner and outer conduits, each having alternating bellows portions and tee portions. The inner bellows portion comprises an inner bellows section arranged between inner conduit sections. The outer bellows portion comprises an outer bellows section arranged between outer conduit sections, where the outer bellows section and outer conduit sections have inner cross-sections of a size sufficient to surround said inner conduit sections and inner bellows section and said outer bellows portion has a length that is less than the length of the inner bellows portion. The outer tee portion is formed in at least two pieces. The inner conduit is welded together with the outer bellows portion surrounding the inner bellows portion. The outer conduit is assembled by welding the two pieces of the outer tee portion to each other and to the conduit section of the outer bellows portions.

In a preferred embodiment the conduits and bellows have a circular cross-section, and baffles are provided to separate the inner and outer conduits and allow flow of fluid therebetween.

DESCRIPTION OF THE PREFERRED EMBODIMENT

Figure 1:
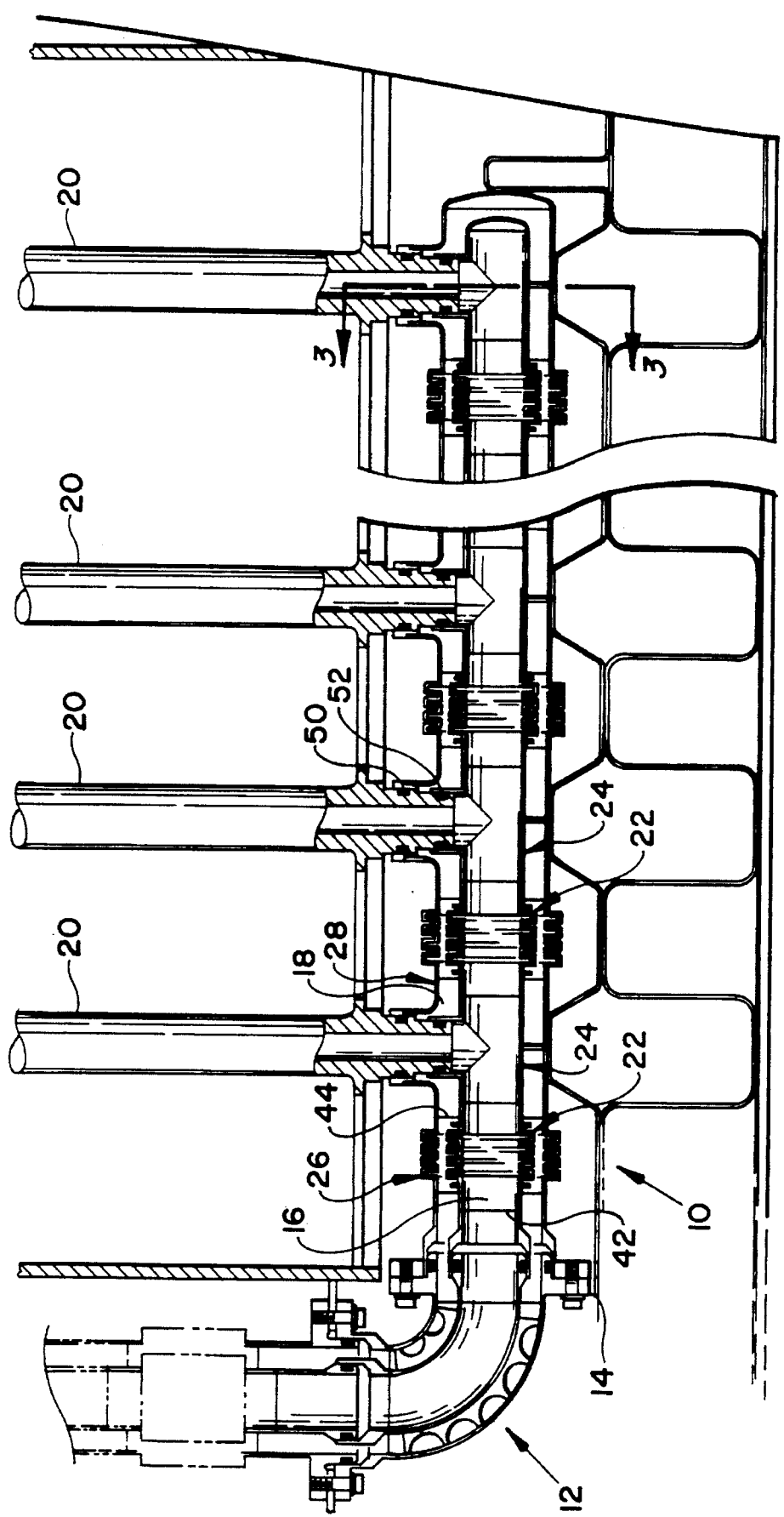
FIG. 1 is a cross-sectional diagram of a manifold in accordance with the present invention.

FIG. 1 is a longitudinal cross-sectional view of a manifold according to the present invention. The FIG. 1 manifold is particularly designed for conducting and distributing cryogenic fluid, such as liquid oxygen. Similar manifolds may also be used to conduct high temperature fluids. At the left end of FIG. 1 the manifold assembly 10 is connected to an elbow joint 12 by a flange 14. Manifold assembly 10 comprises an inner conduit 16 and a concentric outer conduit 18. Inner conduit 16 conducts liquid oxygen to manifold outlets struts 20. Concentric outer conduit 18 provides an intermediate space between conduit 16 and the environment and typically may be used to conduct an inert gas for providing thermal insulation and protection against leakage of liquid oxygen to the environment.

Inner conduit 16 includes alternating bellows portions 22 and tee portions 24. Likewise, outer conduit 18 comprises alternating bellows portion 26 and outer tee portions 28.

The present invention comprises an improved construction for a manifold assembly wherein alternating inner bellows portions 22 and inner tee portions 24 can be welded together and outer bellows portion 26 and outer tee portions 26, 28 can be welded together, providing a strong and compact assembly without the need for heavy and bulky flange joints and seals portions. It will be understood by those skilled in the art that because of the extremely low temperature of the liquid oxygen which is intermittently provided to inner conduit 16, the inner and outer conduits will undergo different thermal contraction and expansion with respect to each other and with respect to struts 20 during manifold operation. Inner and outer bellows portions 22 and 26 accommodate this thermal expansion and contraction without undue mechanical stress on the assembly.

Figure 2:
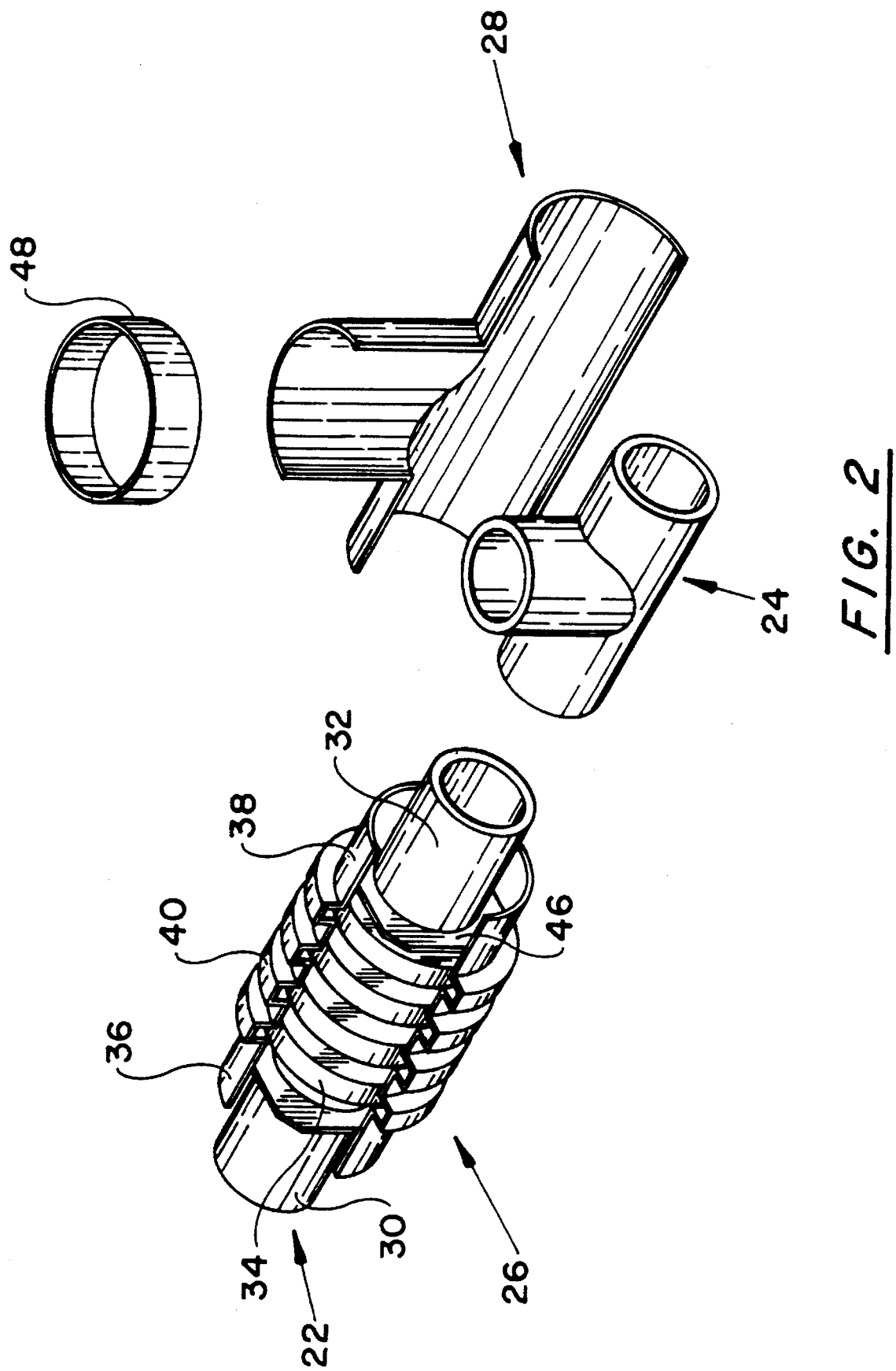
FIG. 2 is a perspective, partially cross-section and partially exploded view of a section of the FIG. 1 manifold.

The partially cross-sectioned and partially exploded view of FIG. 2 illustrates in detail the construction of the manifold according to the present invention. Inner bellows portion 22 comprises conduit sections 30 and 32 arranged on either side of inner bellows section 34. Outer bellows portions 26 likewise includes outer conduit sections 36 and 38 arranged on either of outer bellows section 40. The inner diameter or cross section of outer conduit sections 36 and 38 and outer bellows section 40 is sufficiently large to accommodate the outer diameter of inner bellows section 34 so that inner bellows portion 22 can be inserted through outer bellows portion 26. The length of inner conduit sections 30 and 32 is selected such that inner bellows portion 22 has an axial length which is greater than the length of outer bellows portions 26. This can also be seen in the cross-sectional view of FIG. 1, wherein the joints between the inner and outer bellows and tee portions are illustrated at 42 and 44.

A baffle member 46 is provided between inner conduit section 32 and outer conduit section 38 to maintain the concentric relation between inner and outer conduits of the manifold but allow passage of fluid, such as inert gas, in the space between the inner and outer conduits.

Inner tee portion 24 is joined to inner conduit section 32 of inner bellows portions 22 by welding. For example, a circular weld can be achieved with easy access prior to the assembly of outer tee portions 28 to outer conduit section 38 because of the greater length of inner bellows portions 22. It is, therefore, possible to fully assemble the inner conduit consisting of alternating bellows portions 23 and tee portions 24 with outer bellows portions 26 surrounding the inner bellows portions.

Figure 4:
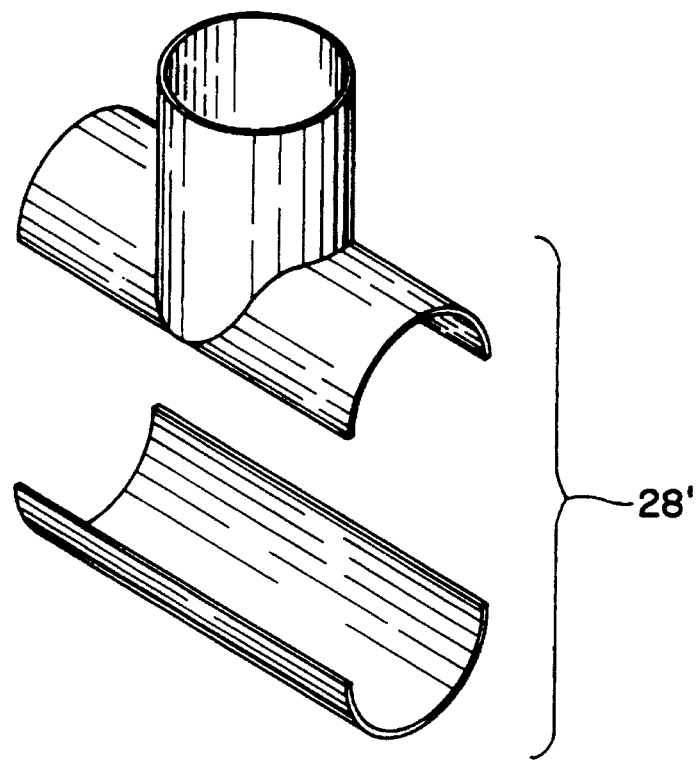
FIG. 4 is an alternate arrangement for the outer conduit tee used in the FIG. 1 manifold.

Because outer tee portion 28 is formed in two pieces, only one of which is shown in FIG. 2, outer tee portion 28 may be welded together around inner tee portion 24 and have its ends joined to outer conduit section 38 of outer conduit bellows portions 26 by circular welds to complete the manifold assembly. As shown in FIG. 2, outer tee portions 28 can be formed of two identical pieces which are joined along a symmetrical plane of the tee. Alternatively, it is possible to form the outer tee portions from two pieces joined along other longitudinal seems, such as the two pieces 28' shown in FIG. 4, which are joined along non-symmetrical axial seams.

Figure 3:
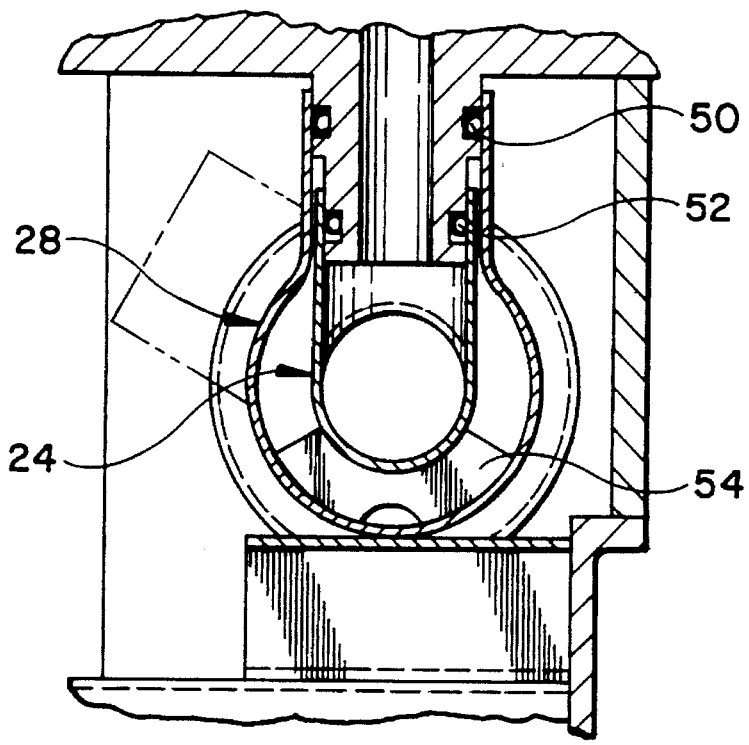
FIG. 3 is a transverse cross-section of the FIG. 1 manifold.

A seal inlet 48 can be brazed into outer tee portion 28 after assembly of the manifold to accommodate outer seal 50 between strut 20 and outer tee portions 28. Likewise, similar concentric seals can be machined into inner tee 24 to accommodate seal 52. Detail of the sealing surface and assembly is shown in FIG. 3, which additionally shows the provision of a support baffle 54 between the inner tee portions and the outer tee portion.

While there has been described what is believed to be the preferred embodiment of the invention, those skilled in the art will recognize that other changes and modifications may be made thereto without departing from the spirit of the invention, and it is intended to claim all such changes and modifications as fall within the true scope of the invention.

I claim:

1. A manifold assembly for accommodating fluids having high temperature difference from the surrounding environment, comprising an inner conduit, said inner conduit including inner bellows portions and inner tee portions, said inner bellows portions including inner bellows sections arranged between inner conduit sections, and an outer conduit comprising outer bellows portions and outer tee portions, said outer bellows portions comprising outer bellows sections having a cross-sectional size sufficient to surround said inner bellows section and arranged between outer conduit sections having a cross-sectional size sufficient to surround said inner bellows section, said outer bellows portions having a length which is less than the length of said inner bellows portion and said outer tee portions being formed in at least two pieces, said inner conduit being assembled by welding said inner bellows to said inner tee portions while said outer bellows portions surround said inner bellows portions, and said outer conduit being assembled by welding said two pieces of said outer tee portions to each other and to said outer bellows.

2. A manifold assembly as specified in claim 1 wherein there are provided baffle members to maintain said outer bellows portions concentric with said inner bellows portions and allow fluid passage between said inner and outer conduits.

3. A manifold assembly as specified in claim 1 wherein said inner bellows sections and inner conduit sections and said outer bellows sections and outer conduit sections are circular in cross-section.

4. A manifold assembly as specified in claim 1 wherein said at least two pieces of said outer tee portions are symmetrical.

* * * * *